(12) United States Patent
Nguyen et al.

(10) Patent No.: US 11,582,035 B2
(45) Date of Patent: Feb. 14, 2023

(54) METHOD OF GENERATING A SECRET KEY FOR DATA COMMUNICATION AND KEY GENERATOR THEREOF

(71) Applicant: Agency for Science, Technology and Research, Singapore (SG)

(72) Inventors: Duy Hieu Nguyen, Singapore (SG); Sumei Sun, Singapore (SG); Yong Dong Wu, Singapore (SG); Boon Shyang Lim, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 278 days.

(21) Appl. No.: 16/499,132

(22) PCT Filed: Mar. 28, 2018

(86) PCT No.: PCT/SG2018/050149
§ 371 (c)(1),
(2) Date: Sep. 27, 2019

(87) PCT Pub. No.: WO2018/182520
PCT Pub. Date: Oct. 4, 2018

(65) Prior Publication Data
US 2021/0091942 A1   Mar. 25, 2021

(30) Foreign Application Priority Data
Mar. 28, 2017   (SG) .............................. 10201702515T

(51) Int. Cl.
*H04L 9/08*   (2006.01)
*H04L 25/02*   (2006.01)
*H04L 9/40*   (2022.01)

(52) U.S. Cl.
CPC .......... *H04L 9/0875* (2013.01); *H04L 9/0866* (2013.01); *H04L 25/0202* (2013.01); *H04L 63/0428* (2013.01)

(58) Field of Classification Search
CPC . H04L 9/0875; H04L 9/0866; H04L 25/0202; H04L 63/0428
(Continued)

(56) References Cited

U.S. PATENT DOCUMENTS

| 7,769,075 B2 | 8/2010 | Hosseinian et al. |
| 8,238,551 B2 | 8/2012 | Reznik et al. |

(Continued)

FOREIGN PATENT DOCUMENTS

| CN | 103763698 A | 4/2014 |
| CN | 106027242 A | 10/2016 |

OTHER PUBLICATIONS

Tomoyuki Aono,; Wireless Secret Key Generation Exploiting Reactance-Domain Scalar Response of Multipath Fading Channels; IEEE:-2016; pp. 3776-3784.*
(Continued)

*Primary Examiner* — Monjur Rahim
(74) *Attorney, Agent, or Firm* — Shackelford, Bowen, McKinley & Norton, LLP

(57) ABSTRACT

A method for generating a secret key at a first node for data communication between the first node and a second node. A channel estimate of a communication channel between the first and second nodes is obtained. A time-frequency matrix associated with the communication channel is then obtained based on the time-frequency transformation of the channel estimate. The secret key is then produced based on the time-frequency matrix. Furthermore, a corresponding key generator may be provided for generating a secret key.

14 Claims, 11 Drawing Sheets

(58) Field of Classification Search
USPC ........................................................ 713/153
See application file for complete search history.

(56) References Cited

U.S. PATENT DOCUMENTS

| | | | | |
|---|---|---|---|---|
| 8,503,673 | B2 | 8/2013 | Patwari et al. | |
| 2003/0016770 | A1* | 1/2003 | Trans ................... | H04L 1/0054 375/346 |
| 2006/0003710 | A1* | 1/2006 | Nakagawa .............. | H04L 27/20 455/101 |
| 2007/0177729 | A1* | 8/2007 | Reznik ................ | H04W 12/041 380/44 |
| 2007/0217530 | A1 | 9/2007 | Hosseinian et al. | |
| 2009/0225982 | A1* | 9/2009 | Yener ...................... | H04L 63/06 380/44 |
| 2011/0007757 | A1* | 1/2011 | Khojastepour ....... | H04L 1/0076 370/479 |
| 2012/0159147 | A1 | 6/2012 | Ando | |
| 2012/0300877 | A1* | 11/2012 | Murakami ........ | H04L 25/03942 375/296 |
| 2015/0195670 | A1* | 7/2015 | Agee .................... | H04B 1/7103 375/133 |
| 2015/0372809 | A1* | 12/2015 | Lima ..................... | H04L 1/1812 713/168 |

OTHER PUBLICATIONS

International Search Report for International Application No. PCT/SG2018/050149 dated Jun. 7, 2018, pp. 1-4.
Written Opinion of the International Searching Authority for International Application No. PCT/SG2018/050149 dated Jun. 7, 2018, pp. 1-4.
John G. Daugman, "Uncertainty Relation for Resolution in Space, Spatial Frequency, and Orientation Optimized by Two-Dimensional Visual Cortical Filters," Journal of the Optical Society of America A, vol. 2, No. 7, Jul. 1985, pp. 1160-1169.
Diffie et al., "New Directions in Cryptography," IEEE Transactions on Information Theory, vol. IT-22, No. 6, Nov. 1976, pp. 644-654.
Mathur et al., "Radio-Telepathy: Extracting a Secret Key from an Unauthenticated Wireless Channel," Proceedings of the 14th ACM international Conference on Mobile Computing and Networking, Sep. 2008, pp. 128-139.
Wang et al., "Cooperative Secret Key Generation from Phase Estimation in Narrowband Fading Channels," IEEE Journal on Selected Areas in Communication, vol. 30, No. 9, Oct. 2012, pp. 1666-1674.
Ren et al., "Secret Key Generation Exploiting Channel Characteristics in Wireless Communications," IEEE Wireless Communications, vol. 18, No. 4, Aug. 2011, pp. 6-12.
Azimi-Sadjadi et al., "Robust Key Generation from Signal Envelopes in Wireless Networks," Proceedings of the 14th ACM Conference on Computer and Communications Security, Oct. 2007, pp. 401-410.
Haroun et al., "Secret Key Generation Using Chaotic Signals over Frequency Selective Fading Channels," IEEE Transactions on Information Forensics and Security, vol. 10, No. 8, Aug. 2015, pp. 1764-1775.
D. Gabor, Theory of Communication—Part 3: Frequency Compression and Expansion, Journal of the Institution of Electrical Engineers—Part III: Radio and Communication Engineering, vol. 93, No. 26, Nov. 1946, pp. 445-457.
Shen et al., "A Review of Gabor Wavelets for Face Recognition," Pattern Analysis and Applications, vol. 9, 2006, pp. 273-292.
Tai Sing Lee, "Image Representation Using 2D Gabor Wavelets," IEEE Transactions on Pattern Analysis and Machine Intelligence, vol. 18, No. 10, Oct. 1996, pp. 959-971.
Szmajda et al., "Gabor Transform, SPWVD, Gabor-Wigner Transform and Wavelet Transform—Tools for Power Quality Monitoring," Metrology and Measurement Systems, vol. 17, No. 3, Dec. 2010, pp. 383-396.
Cho et al., "Time-Frequency Analysis of Power-Quality Disturbances via the Gabor-Wigner Transform," IEEE Transactions on Power Delivery, vol. 25, No. 1, Jan. 2010, pp. 494-499.
Reising et al., "Authorized and Rogue Device Discrimination Using Dimensionally Reduced RF-DNA Fingerprints," IEEE Transactions on Information Forensics and Security, vol. 10, No. 6, Jun. 2015, pp. 1180-1192.
National Institute of Standards and Technology, "A Statistical Test Suite for Random and Pseudorandom Number Generators for Cryptographic Applications," Apr. 2010, pp. 1-131.
Zhang et al., "Efficient Key Generation by Exploiting Randomness From Channel Responses of Individual OFDM Subcarriers," IEEE Transactions on Communications, vol. 64, No. 6, Apr. 7, 2016, pp. 2578-2588.
Chen et al., "Secret Key Establishment Using Temporally and Spatially Correlated Wireless Channel Coefficients," IEEE Transactions on Mobile Computing, vol. 10, No. 2, Feb. 2011, pp. 205-215.

* cited by examiner

Input: $G_A$, $G_B$, $w_{x,e}$, and $w_{y,e}$

Output: two lists $l_x$ and $l_y$

At A side:

Initialize a blacklist $\Phi_A \in \mathbb{R}^{M \times K} = 0$;

for $m = 1$ to $M - w_{x,e} + 1$ for $k = 1$ to $K - w_{y,e} + 1$ if $G_A(m,k) \geq q_{A,+}$ (or $G_A(m,k) \leq q_{A,-}$) and $\Phi_A(m,k) = 0$, $\forall m \in \{m_s, m_s+1,$ $..., m_s + w_{x,e} - 1\}$ and $k \in \{k_s, k_s+1, ..., k_s + w_{y,e} - 1\}$ then $m_e := m_s + w_{x,e} - 1$ and $k_e := k_s + w_{y,e} - 1$;

do $m_e := m_e + 1$ and $k_e := k_e + 1$;

while $G_A(m,k) \geq q_{A,+}$ (or $G_A(m,k) \leq q_{A,-}$) and $\Phi_A(m,k) = 0$, $\forall m \in \{m_s,$ $..., m_e + 1\}$ and $k \in \{k_s, ..., k_e + 1\}$;

end $l_{A,x} := [l_{A,x}; \lfloor \frac{m_s + m_e}{2} \rfloor]$;

$l_{A,y} := [l_{A,y}; \lfloor \frac{k_s + k_e}{2} \rfloor]$;

$\Phi_A(m,k) := 1$, $\forall m \in \{m_s, ..., m_e\}$ and $k \in \{k_s, ..., k_e\}$;

end;

end;

A sends $\{l_{A,x}, l_{A,y}\}$ to B via a public channel;

end;

At B side:

for $i = 1$ to length$[l_{A,x}]$ if $G_B(m,k) \geq q_{B,+}$ or $\leq q_{B,-}$, $\forall m \in \left\{ l_{A,x}(i) - \left\lceil \frac{w_{x,e}-2}{2} \right\rceil, ..., l_{A,x}(i) + \left\lceil \frac{w_{x,e}+2}{2} \right\rceil \right\}$ and $k \in \left\{ l_{A,y}(i) - \left\lceil \frac{w_{y,e}-2}{2} \right\rceil, ..., l_{A,y}(i) + \left\lceil \frac{w_{y,e}+2}{2} \right\rceil \right\}$ then $l_x := [l_x; l_{A,x}(i)]$;

$l_y := [l_{A,y}; l_{A,y}(i)]$;

end end;

B sends $\{l_x, l_y\}$ to A via a public channel;

end;

FIG. 6

Bit disagreement probability ~ 0%

US 11,582,035 B2

METHOD OF GENERATING A SECRET KEY FOR DATA COMMUNICATION AND KEY GENERATOR THEREOF

CROSS-REFERENCE TO RELATED APPLICATION

This application claims the benefit of priority of Singapore Patent Application No. 10201702515T, filed 28 Mar. 2017, the content of which being hereby incorporated by reference in its entirety for all purposes.

TECHNICAL FIELD

The present invention generally relates to a method of generating a secret key at a first node for data communication between the first node and a second node, and a key generator thereof.

BACKGROUND

Communication networks, including the next generation of communication networks, require significant improvement over conventional performance metrics, such as spectral efficiency, energy efficiency, and/or transmission delay. A rising number of security breaches and sabotages, however, has elevated the community awareness on cyber threats towards our mostly fragile systems. As a consequence, security has also become an important factor to be considered in specifying and designing communication networks.

In typical communication systems, the users (i.e., communicating nodes) first need to authenticate each other to ensure their legitimacy. After the authentication process, the legitimate users also need to establish a secret key for data transmission. By encrypting the data with the secret key, the legitimate users may prevent possible eavesdroppers from obtaining important and/or private information. In this regard, conventional network security mechanisms may rely upon a certification authority with a corresponding key management infrastructure. However, communication networks are fast being dominated by mobile users under a dynamic environment with, ideally, quick and secured peer-to-peer associations. It is thus difficult to maintain and ensure the availability of a key management center. Furthermore, communications between low/limited-energy devices are expected to become more prevalent, such as in sensor and/or green networks which rely on renewable energy sources. In this regard, conventional mechanisms used to generate a symmetric key between two users, such as Diffie-Hellman key agreement protocol may not be preferable due to its high computational overhead and energy consumption.

A need therefore exists to provide a method of generating a secret key for data communication, and a key generator thereof, that seek to overcome, or at least ameliorate, one or more of the deficiencies in conventional key generation techniques, such as but not limited to, a decentralized key generation technique for data communication that is efficient, as well as being secured. It is against this background that the present invention has been developed.

SUMMARY

According to a first aspect of the present invention, there is provided a method of generating a secret key at a first node for data communication between the first node and a second node, the method comprising:

obtaining a channel estimate of a communication channel between the first and second nodes;

obtaining a time-frequency matrix associated with the communication channel based on a time-frequency transformation of the channel estimate; and producing the secret key based on the time-frequency matrix.

In various embodiments, the above-mentioned obtaining the channel estimate comprises receiving, at the first node, a training signal from the second node via the communication channel, and determining the channel estimate based on the received training signal.

In various embodiments, the time-frequency matrix comprises a plurality of time-frequency features, each time-frequency feature associated with a respective index of the time-frequency matrix.

In various embodiments, the above-mentioned obtaining the time-frequency matrix comprises:

determining a plurality of time-frequency transformation coefficients based on the time-frequency transformation of the channel estimate; and determining the plurality of time-frequency features based on the plurality of time-frequency transformation coefficients.

In various embodiments, the above-mentioned producing the secret key comprises:

determining, for each index of the time-frequency matrix, whether the corresponding time-frequency feature at the index satisfies a predetermined condition; and producing the secret key based on said determining, for each index of the time-frequency matrix, whether the corresponding time-frequency feature at the index satisfies the predetermined condition.

In various embodiments, the above-mentioned producing the secret key further comprises:

identifying each index of the time-frequency matrix at which the corresponding time-frequency feature satisfies the predetermined condition to obtain a set of identified indexes;

sending the set of identified indexes to the second node for verification;

receiving a verified set of identified indexes from the second node based on the verification performed at the second node with respect to the set of identified indexes; and producing the secret key based on the verified set of identified indexes.

In various embodiments, the above-mentioned producing the secret key further comprises:

obtaining a first bit sequence based on the verified set of identified indexes;

performing bit reconciliation on the first bit sequence with the second node to obtain a second bit sequence; and producing the secret key based on the second bit sequence.

In various embodiments, the above-mentioned producing the secret key further comprises subjecting the second bit sequence to a cryptographic function to obtain a third bit sequence.

In various embodiments, the above-mentioned producing the secret key further comprises subjecting the third bit sequence as a seed to a pseudo-random function to produce the secret key at the first node.

In various embodiments, the time-frequency transformation is a discrete Gabor transformation of the channel estimate; and the plurality of time-frequency features is obtained based on a plurality of Gabor transformation coefficients derived from the discrete Gabor transformation.

According to a second aspect of the present invention, there is provided a key generator for generating a secret key at a first node for data communication between the first node and a second node, the secret key generator comprising:
  a memory; and
  at least one processor communicatively coupled to the memory and configured to:
    obtain a channel estimate of a communication channel between the first and second nodes;
    obtain a time-frequency matrix associated with the communication channel based on a time-frequency transformation of the channel estimate; and
    produce the secret key based on the time-frequency matrix.

In various embodiments, to obtain the channel estimate, the at least one processor is further configured to:
  receive, at the first node, a training signal from the second node via the communication channel, and
  determine the channel estimate based on the received training signal.

In various embodiments, the time-frequency matrix comprises a plurality of time-frequency features, each time-frequency feature associated with a respective index of the time-frequency matrix.

In various embodiments, to obtain the time-frequency matrix, the at least one processor is further configured to:
  determine a plurality of time-frequency transformation coefficients based on the time-frequency transformation of the channel estimate; and
  determine the plurality of time-frequency features based on the plurality of time-frequency transformation coefficients.

In various embodiments, to produce the secret key, the at least one processor is further configured to:
  determine, for each index of the time-frequency matrix, whether the corresponding time-frequency feature at the index satisfies a predetermined condition; and
  produce the secret key based on said determining, for each index of the time-frequency matrix, whether the corresponding time-frequency feature at the index satisfies the predetermined condition.

In various embodiments, to produce the secret key, the at least one processor is further configured to:
  identify each index of the time-frequency matrix at which the corresponding time-frequency feature satisfies the predetermined condition to obtain a set of identified indexes;
  send the set of identified indexes to the second node for verification;
  receive a verified set of identified indexes from the second node based on the verification performed at the second node with respect to the set of identified indexes; and
  produce the secret key based on the verified set of identified indexes.

In various embodiments, to produce the secret key, the at least one processor is further configured to:
  obtain a first bit sequence based on the verified set of identified indexes;
  perform bit reconciliation on the first bit sequence with the second node to obtain a second bit sequence; and
  produce the secret key based on the second bit sequence.

In various embodiments, to produce the secret key, the at least one processor is further configured to subject the second bit sequence to a cryptographic function to obtain a third bit sequence.

In various embodiments, to produce the secret key, the at least one processor is further configured to subject the third bit sequence as a seed to a pseudo-random function to produce the secret key at the first node.

According to a third aspect of the present invention, there is provided a computer program product, embodied in one or more non-transitory computer-readable storage mediums, comprising instructions executable by at least one processor to perform a method of generating a secret key at a first node for data communication between the first node and a second node, the method comprising:
  obtaining a channel estimate of a communication channel between the first and second node;
  obtaining a time-frequency matrix associated with the communication channel based on a time-frequency transformation of the channel estimate; and
  producing the secret key based on the time-frequency matrix.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 6 shows an example pseudo-code for a two-dimensional (2-D) time-frequency excursion technique according to an example embodiment of the present invention;

DETAILED DESCRIPTION

Figure 1:
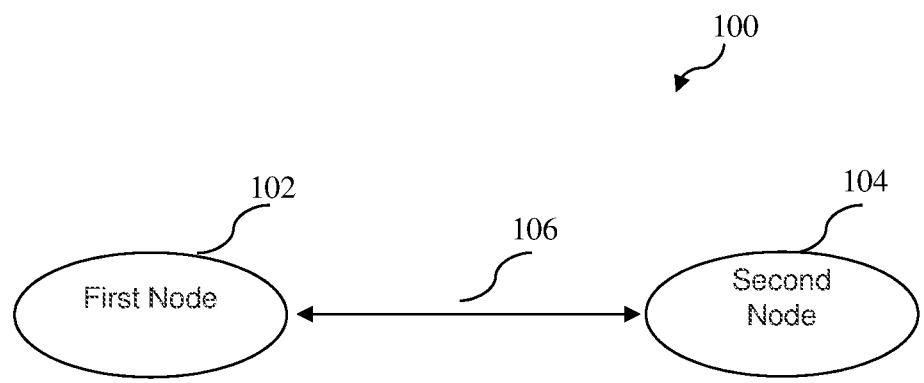
FIG. 1 depicts a schematic drawing showing a communication network system including a first node and a second node, and a communication channel for data communication therebetween according to various embodiments of the present invention.

Various embodiments of the present invention provide a method of generating a secret key (which may also be interchangeably referred to as a private key) at a first node for data communication between the first node and a second node (i.e., a pair of communicating nodes), and a key generator thereof. For illustration purpose only, FIG. 1 depicts a schematic drawing showing a communication network system 100 including a first node 102 and a second node 104, and a communication channel 106 for data communication therebetween. It will be understood by a person skilled in the art that the communication network system 100 may include any number of nodes as desired or as appropriate, and only a pair of nodes are shown in FIG. 1 and described herein for the purposes of brevity and clarity.

In various embodiments, the first and second nodes 102, 104 are part of a communication network system 100, in particular, based on a wireless communication network, such as but not limited to, cellular network (e.g., 3G, 4G, or LTE), Wi-Fi network, Bluetooth, and so on. It can be understood by a person skilled in the art that each node may be any device capable of communicating data (e.g., messages) in a communication network. By way of examples only and without limitations, the device may be a mobile communication device such as a smartphone, a mobile tablet and so on, an Internet of Things (IoT) device configured for any particular application or function, such as a smart meter, a surveillance camera device, a sensor and so on. It will be appreciated by a person skilled in the art that the first node 102 and/or the second node 104 may also be any system capable of communicating data in a communication network, such as but not limited to, a computing system, a server system and so on. Therefore, it will be appreciated by a person skilled in the art that the first and second nodes are not limited to any particular type of device or system, as long as the device or system is configured or operable to communicate data in a communication network. In addition, although various embodiments of the present invention may be described with respect to a pair of communicating nodes (e.g., the first and second nodes 102, 104), it will also be appreciated by a person skilled in the art that the present invention is not limited to the pair of nodes, and each node may communicate data to any other node (not shown) in the communication network as desired or as appropriate in the same or similar manner as described herein with respect to the first and second nodes. In other words, the method of generating a secret key according to various embodiments may be applied to any node for data communication with another node in a communication network.

Figure 2:
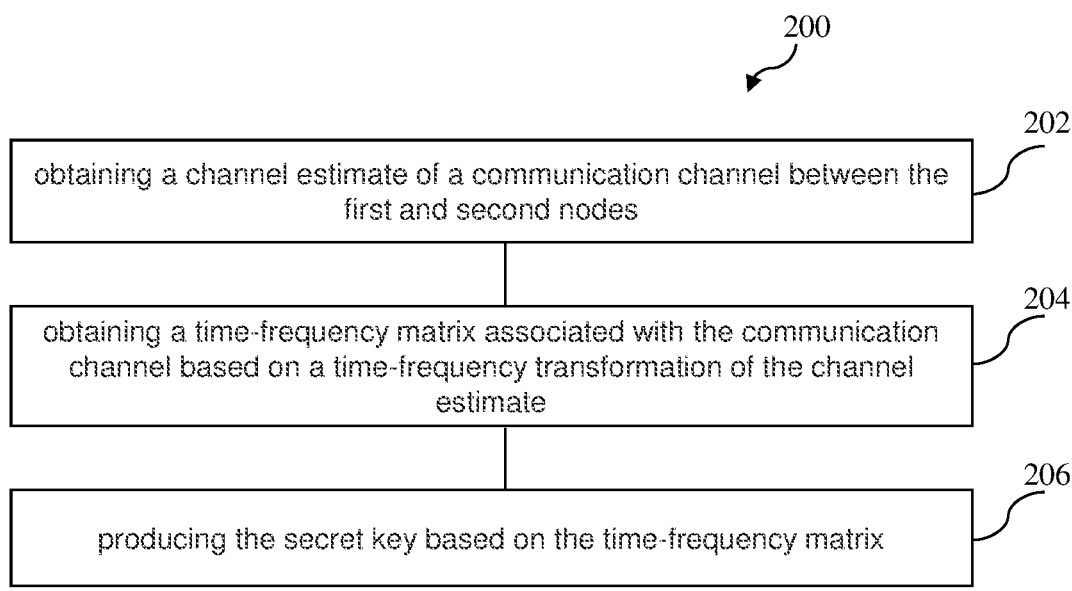
FIG. 2 depicts a schematic flow diagram of a method of generating a secret key at a first node for data communication between the first node and a second node according to various embodiments of the present invention.

FIG. 2 depicts a schematic flow diagram of a method 200 of generating a secret key at a first node 102 for data communication between the first node 102 and a second node 104. The method 200 comprises a step 202 of obtaining a channel estimate of a communication channel between the first and second nodes; a step 204 of obtaining a time-frequency matrix associated with the communication channel based on a time-frequency transformation of the channel estimate; and a step 206 of producing the secret key based on the time-frequency matrix.

Accordingly, the method 200 of generating a secret key is advantageously based on characteristics or features of a communication channel (e.g., wireless communication channel) 106 between the first and second nodes 102, 104 by obtaining a channel estimate of the communication channel 106. In other words, characteristics or features of the communication channel 106 are extracted to generate the secret key. In this regard, due to the communication channel reciprocity, the secret key generated at the first node 102 and the secret key generated at the second node 102 (generated in a corresponding manner as the first node 102) can be identical. As a result, the first node 102 is advantageously able to generate a secret key for data communication with the second node 104, and vice versa, without relying upon a centralized key management server, such as described in the background of the present specification. Therefore, the method 200 of generating a secret key is advantageously decentralized (distributed), and is thus better suited for dynamic environments. Furthermore, since the signal processing is limited to the physical layer only, the consumed energy is minimized.

In addition, the method 200 of generating a secret key is advantageously time-frequency based, that is, generated using both the time and frequency space. Accordingly, the method 200 may also be referred to as a time-frequency based secret key generation method. In particular, the method 200 obtains a time-frequency matrix associated with the communication channel based on a time-frequency transformation (e.g., a Discrete Gabor Transformation (DGT)) of the channel estimate, and produces the secret key based on the time-frequency matrix obtained. Therefore, the method 200 advantageously extracts multi-dimensional features (in particular, joint time-frequency features) from the communication channel for generating the secret key, which has been found according to various embodiments of the present invention to enhance the key bit generation rate (secret key generation rate) as well as the key security.

In various embodiments, the above-mentioned step 202 of obtaining the channel estimate comprises receiving, at the first node 102, a training signal (e.g., pilot signal) from the second node 104 via the communication channel 106, and determining the channel estimate based on the received training signal. For example, the first node 102 may comprise a channel estimator configured to determine the channel estimate of the communication channel 106 based on the received training signal. In this regard, it will be appreciated by a person skilled in the art that various conventional techniques known in the art may be applied to determine the channel estimate of a communication channel 106, and thus need not be described herein. By way of examples only and without limitation, the channel estimate may be determined using one or more of minimum mean squared error (MMSE)

channel estimation, least squares (LS) channel estimation, maximum likelihood (ML) channel estimation, and so on.

In various embodiments, the time-frequency matrix comprises a plurality of time-frequency features, each time-frequency feature associated with a respective index of the time-frequency matrix. In various embodiments, the time-frequency matrix may be a two-dimensional matrix (e.g., frequency vs time) comprising a plurality of elements (entries), each element being a time-frequency feature and is indexed by time and frequency indexes. Therefore, each time-frequency feature may also be referred to as an indexed time-frequency feature of the time-frequency matrix.

In various embodiments, the above-mentioned step 204 of obtaining the time-frequency matrix comprises determining a plurality of time-frequency transformation coefficients based on the time-frequency transformation of the channel estimate, and determining the plurality of time-frequency features based on the plurality of time-frequency transformation coefficients. In other words, the time-frequency transformation of the channel estimate may be performed to derive a plurality (or a set or vector) of time-frequency transformation coefficients, and the plurality of time-frequency features may then be determined (e.g., respectively) based on the plurality of time-frequency transformation coefficients. As an example, in the case of the time-frequency transformation being a DGT, the time-frequency transformation coefficients may be the DGT coefficients (or simply referred to as the Gabor coefficients), and the time-frequency features may be the normalized magnitude-square DGT coefficients.

In various embodiments, the above-mentioned step 206 of producing the secret key comprises determining, for each index of the time-frequency matrix, whether the corresponding time-frequency feature at the index satisfies a predetermined condition; and producing the secret key based on such a determining step. In various embodiments, the predetermined condition may include one or more threshold-based conditions. For example, a first threshold condition may be whether the time-frequency feature at the index is greater than or equal to a first threshold value and a second threshold condition may be whether the time-frequency feature at the index is lower than or equal to a second threshold value. For example, the first node 102 may determine the first and second threshold values based on the time-frequency matrix. For example, a first bit value (e.g., bit "1") may be assigned to an index of the time-frequency matrix at which the corresponding time-frequency feature is determined to satisfy the first threshold condition, and a second bit value (e.g., bit "0") may be assigned to an index of the time-frequency matrix at which the corresponding time-frequency feature is determined to satisfy the second threshold condition. Thereafter, a secret key may then be generated based on the bit values assigned to the indexes of the time-frequency matrix. For example, a bit sequence may be derived based on the bit values assigned to the indexes of the time-frequency matrix and the secret key may then be generated based on such a bit sequence. It will be appreciated by a person skilled in the art that the present invention is not limited to the above-mentioned threshold-based conditions, and other threshold-based conditions may be provided or set as desired or as appropriate without deviating from the scope of the present invention.

In various embodiments, the above-mentioned step 206 of producing the secret key further comprises identifying each index of the time-frequency matrix at which the corresponding time-frequency feature satisfies the predetermined condition to obtain a set (e.g., candidate set) of identified indexes; sending the set of identified indexes to the second node 104 for verification; receiving a verified set of identified indexes from the second node 104 based on the verification performed at the second node with respect to the set of identified indexes; and producing the secret key based on the verified set of identified indexes. For example, the first node 102 generates its own secret key and the second node 104 also generates its own secret key in the same or corresponding manner as the first node 102 based on the same communication channel 106 between the first and second nodes 102, 104. As a result, the method of generating a secret key according to various embodiments of the present invention is advantageously decentralized (distributed). In this regard, the above-mentioned steps advantageously facilitate (e.g., improve the probability) the generation of secret keys at the first and second nodes 102, 104 to be identical by verifying the candidate set of identified indexes obtained at the first node 102 with the second node 104 to arrive at a verified set of identified indexes (e.g., an agreed set of identified indexes).

In various embodiments, the above-mentioned step 206 of producing the secret key further comprises obtaining a first bit sequence (e.g., a raw bit sequence) based on the verified set of identified indexes; performing bit reconciliation on the first bit sequence with the second node 104 to obtain a second bit sequence (e.g., a reconciled bit sequence); and producing the secret key based on the second bit sequence. In this regard, the above-mentioned steps advantageously enable key reconciliation between the first and second nodes 102, 104, that is, to reconcile bit discrepancies between their respective generated bit sequences (based on which their respective secret keys are to be generated). In this regard, it has been identified according to various embodiments of the present invention that, for example, due to the channel randomness and hardware variations between the first and second nodes 102, 104, the bit sequences (the first or raw bit sequences) obtained at the first and second nodes 102, 104, respectively, may still be different in certain regions/portions. Therefore, the above-mentioned steps advantageously address such possible bit discrepancies through key reconciliation, thereby further facilitating (e.g., further improving the probability) the generation of secret keys at the first and second nodes 102, 104 to be identical.

In various embodiments, the above-mentioned step 206 of producing the secret key further comprises subjecting the second bit sequence (e.g., the reconciled bit sequence) to a cryptographic function to obtain a third bit sequence (e.g., a final bit sequence). In this regard, it has been identified according to various embodiments of the present invention that, for example, if an error correcting information is exchanged between the first and second nodes 102, 104, an eavesdropper may be able to guess portions of the generated bit sequence (e.g., the reconciled bit sequence). Therefore, the above-mentioned step advantageously address such a possible privacy issue by subjecting the second bit sequence to a cryptographic function so as to enhance privacy. It will be appreciated by a person skilled in the art that various conventional cryptographic function may be applied, such as but not limited to, a fuzzy extractor or a hash function.

In various embodiments, the above-mentioned step 206 of producing the secret key further comprises subjecting the third bit sequence (e.g., the final bit sequence) as a seed to a pseudo-random function to produce the secret key at the first node 102.

Therefore, according to various embodiments of the present invention, a method of generating a secret key for data communication is provided that is advantageously decentralized (e.g., without relying on a centralized key management server), as well as being more efficient (e.g., resulting in lower power consumption) and more secure.

As described hereinbefore, the method of generating a secret key for data communication according to various embodiments of the present invention is advantageously decentralized. That is, the first node 102 generates its own secret key and the second node 104 also generates its own secret key based on the same communication channel 106 between the first and second nodes 102, 104. Therefore, although various embodiments of generating a secret key have been described hereinbefore from the perspective of the first node 102, it will be appreciated that the secret key may also be generated at the second node 104 (or any other node in a communication network) in the same or corresponding or reciprocal manner as the first node 102. Therefore, a method of generating a secret key need not be repeated (described again) with respect to the second node 104 (or any other node in a communication network) for clarity and conciseness. Nevertheless, for illustration purpose only, an example flow diagram will be described later below with reference to FIG. 9 to show the secret key generation steps at both the first and second nodes (first and second users) 102, 104 according to various example embodiments of the present invention.

Figure 3:
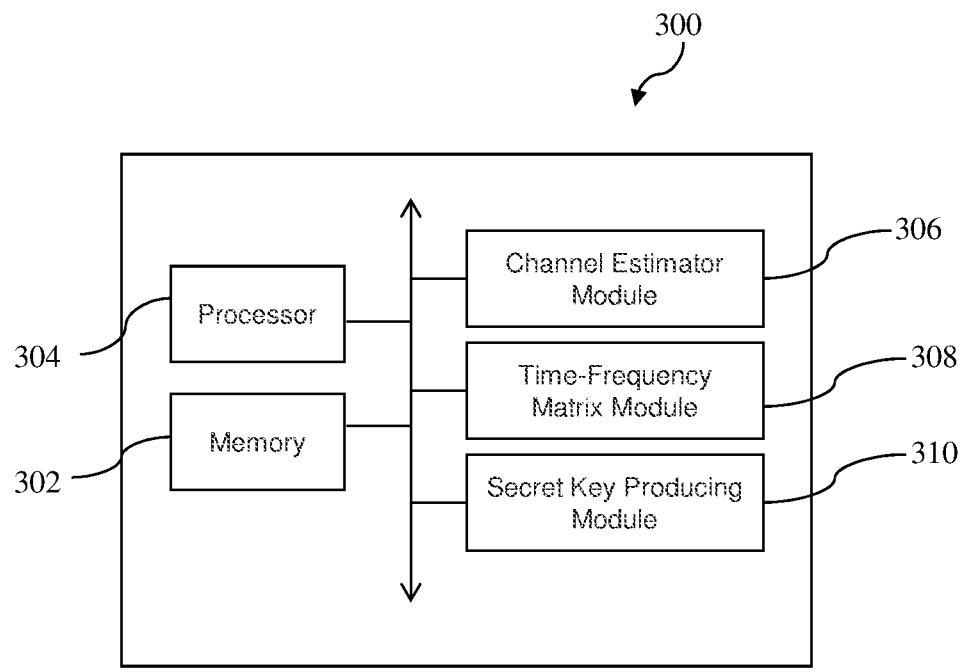
FIG. 3 depicts a schematic block diagram of a key generator for generating a secret key at a first node for data communication between the first node and the second node according to various embodiments of the present invention.

FIG. 3 depicts a schematic block diagram of a key generator 300 for generating a secret key at a first node 102 for data communication between the first node 102 and the second node 104 according to various embodiments of the present invention, such as corresponding to the method 200 of generating a secret key as described hereinbefore according to various embodiments of the present invention. In various embodiments, the key generator 300 may be embodied as a component or a part of a device or system, or may be embodied as a separate stand-alone device or system for generating a secret key.

The key generator 300 comprises a memory 302, and at least one processor 304 communicatively coupled to the memory 302 and configured to: obtain a channel estimate of a communication channel between the first and second nodes 102, 104; obtain a time-frequency matrix associated with the communication channel based on a time-frequency transformation of the channel estimate; and produce the secret key based on the time-frequency matrix.

It will be appreciated by a person skilled in the art that the at least one processor 304 may be configured to perform the required functions or operations through set(s) of instructions (e.g., software modules) executable by the at least one processor 304 to perform the required functions or operations. Accordingly, as shown in FIG. 3, the key generator 300 may further comprise a channel estimator module or circuit 306 configured to obtain a channel estimate of a communication channel 106 between the first and second nodes 102, 104; a time-frequency matrix module or circuit 308 configured to obtain a time-frequency matrix associated with the communication channel 106 based on a time-frequency transformation of the channel estimate; and a secret key producing module 310 configured to produce the secret key based on the time-frequency matrix.

It will be appreciated by a person skilled in the art that the above-mentioned modules are not necessarily separate modules, and one or more modules may be realized by or compiled as one functional module (e.g., a circuit or a software program) as desired or as appropriate without deviating from the scope of the present invention. For example, the channel estimator module 306, the time-frequency matrix module 308 and the secret key producing module 310 may be realized (e.g., compiled together) as one executable software program (e.g., software application or simply referred to as an "app"), which for example may be stored in the memory 302 and executable by the at least one processor 304 to perform the functions/operations as described herein according to various embodiments.

In various embodiments, the key generator 300 corresponds to the method 200 as described hereinbefore with reference to FIG. 2, and therefore, various functions or operations configured to be performed by the least one processor 304 may correspond to various steps of the method 200 described hereinbefore according to various embodiments, and thus need not be repeated with respect to the key generator 300 for clarity and conciseness. In other words, various embodiments described herein in context of the methods are analogously valid for the respective systems or devices, and vice versa.

For example, in various embodiments, the memory 302 may have stored therein the channel estimator module 306, the time-frequency matrix module 308 and/or the secret key producing module 310, which respectively correspond to various steps of the method 200 as described hereinbefore, which are executable by the at least one processor 304 to perform the corresponding functions/operations as described herein.

A computing system, a controller, a microcontroller or any other system providing a processing capability may be provided according to various embodiments in the present disclosure. Such a system may be taken to include one or more processors and one or more computer-readable storage mediums. For example, the key generator 300 described hereinbefore may include a processor (or controller) 304 and a computer-readable storage medium (or memory) 302 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "obtaining", "generating", "deriving", "determining", "identifying", "performing", "subjecting", "sending" or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a system, a device or an apparatus for performing the operations/functions of the methods described herein. Such a system, device or apparatus may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated by a person skilled in the art that various modules described herein (e.g., the channel estimator module 306, the time-frequency matrix module 308 and the secret key producing module 310) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., the channel estimator module 306, the time-frequency matrix module 308 and/or the secret key producing module 310) executable by one or more computer processors to perform a method 200 for generating a secret key as described hereinbefore with reference to FIG. 2. Accordingly, various computer programs or modules described herein may be stored in a computer program product receivable by a computer system or an electronic device therein for execution by at least one processor of the system or device to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 4:
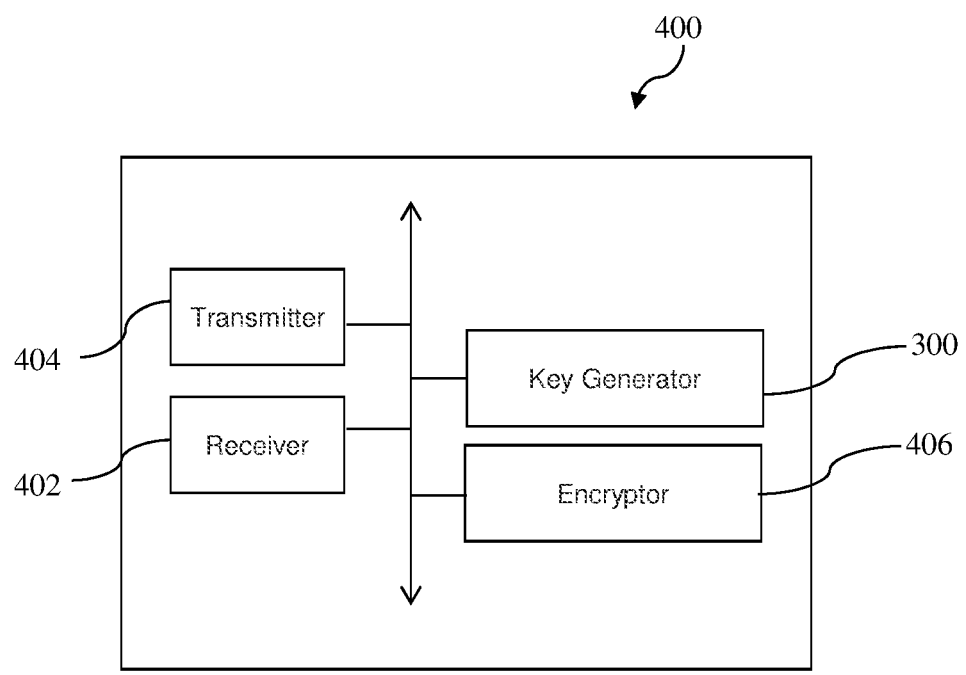
FIG. 4 depicts a schematic drawing of a device (or a system) comprising a key generator as described hereinbefore with reference to FIG. 3 according to various embodiments of the present invention.

FIG. 4 depicts a schematic drawing of a device (or a system) 400 comprising a key generator 300 as described hereinbefore with reference to FIG. 3, a receiver 402 configured to receive data, a transmitter 404 configured to send data, and an encryptor 406 configured to encrypt data using the secret key generated by the key generator 300 to produce an encrypted data. It will be appreciated by a person skilled in the art that the receiver 402 and the transmitter 404 are not necessarily separate units or components, and may be realized as one integrated unit or component (a transceiver) as desired or as appropriate. For example, a secret key may be generated by the key generator 300 in a manner as described hereinbefore according to various embodiments for data communication with another device (or system) via a communication channel, and the encryptor 406 may then encrypt data desired to be transmitted to the other device to produce an encrypted data before being transmitted by the transmitter 404 to the other device.

In various embodiments, there may also be provided a communication network system comprising a plurality of devices (or systems) 400 capable of or operable to communicate data with each other, such as a first device and a second device as illustrated in FIG. 1. In this regard, each device (or system) 400 may comprise a key generator 300 as described hereinbefore with reference to FIG. 3 according to various embodiments of the present invention, whereby the key generator 300 is configured to generate a secret key for data communication with another device. Therefore, the key generator 300 may generate a plurality of secret keys (e.g., may be stored in the memory 302) for data communication with a plurality of other devices, respectively. That is, for each pair of the device and another device, at least one secret key is generated at the device for data communication between the pair of communicating devices. For example, the device may encrypt data desired to be transmitted to another device using the corresponding secret key before being transmitted to that other device, and the device may also decrypt encrypted data (via a decryptor at the device) received from that other device using the same corresponding secret key (generated at that other device).

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Various example embodiments provide a method of generating secret keys between communicating nodes for secured communication systems. Advantageously, the method generates secret keys from joint time and frequency domains, which may yield higher secret key generation rate and result in more secured secret keys. In various example embodiments, a two-dimensional excursion algorithm/technique is provided to extract the bit sequence for the secret key from joint time-frequency features.

Various example embodiments exploit the wireless communication channel for secret key generation in contrast to relying on traditional key management infrastructure. For example, the randomness of a wireless communication channel between two legitimate users (i.e., nodes) is extracted to create highly secret keys. Therefore, instead of a centralized key generation approach, the key generation technique according to various example embodiments becomes distributed and is better suited appropriate for dynamic environments. Furthermore, since the signal processing is limited to the physical layer only, the consumed energy is kept to the minimum. Such benefits are important for communication systems, including future communication systems.

Furthermore, according to various example embodiments, a time-frequency based secret key generation method is provided. In this regard, the method may include two main parts or stages. A first stage may be configured to generate a time-frequency matrix (two-dimensional (2-D)) associated with the communication channel based on both the time and frequency space. In this regard, using both dimensions have been found to enhance the bit generation rate (secret key generation rate) as well as the key security. The second stage may be implemented using an excursion algorithm or technique according to various example embodiments to generate the secret key from the 2-D time-frequency matrix. In this regard, the 2-D excursion algorithm may be configured to scan both the time and frequency domains, and assign secret bits for appropriate regions (indexes) of the time-frequency matrix.

Figure 5:
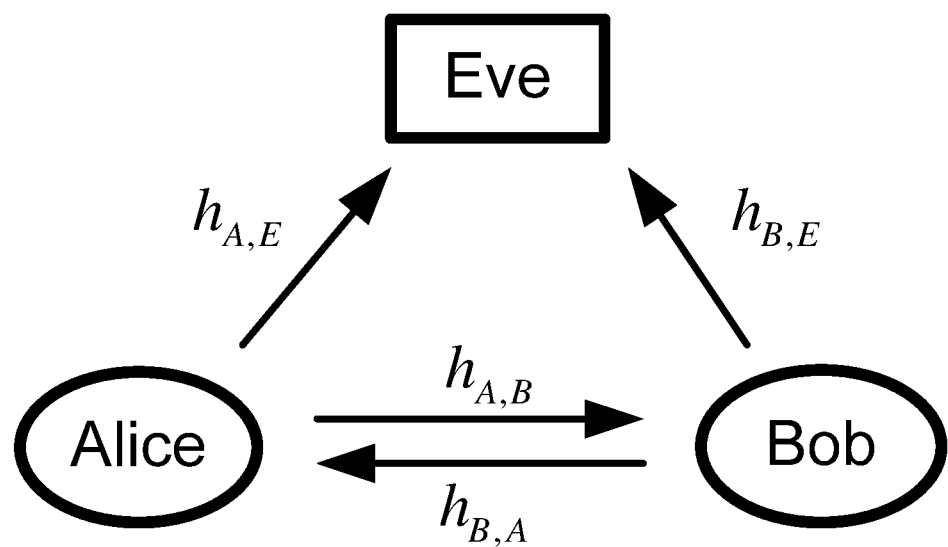
FIG. 5 depicts a schematic drawing of a wireless communication network including legitimate users (nodes), Alice (A) and Bob (B), and a potential eavesdropper, Eve (E), according to various example embodiments of the present invention.

By way of an example only and without limitation, consider a wireless communication network with legitimate users (nodes), Alice (A) and Bob (B), and a potential eavesdropper, Eve (E), as shown in FIG. 5, and consider an information exchange between node A to node B. For example, the complex baseband received signals at nodes A and B may be denoted by $y_A(n)$ and $y_B(n)$, respectively, and expressed as follows:

$$y_A(n) = \hat{h}_{B,A}(n)s_B(n) + w_A(n), \quad \text{(Equation 1)}$$

$$y_B(n) = \hat{h}_{A,B}(n)s_A(n) + w_B(n), \quad \text{(Equation 2)}$$

where n denotes the time instance index; $\hat{h}_{B,A}(n)$ denotes the complex communication channel from node B to node A; $s_B(n)$ denotes the transmitted signal from node B; and $w_A(n)$ denotes the additive noise at node A. It will be understood that $\hat{h}_{A,B}(n)$, $s_A(n)$, and $w_B(n)$ may be defined similarly or correspondingly.

The channel $\hat{h}_{B,A}(n)$ can be estimated at node A by transmitting a training or pilot signal from node B to node A. In this regard, let $h_{B,A}(n)$ denote the estimated channel of channel $\hat{h}_{B,A}(n)$. For ease of presentation, the aggregated estimated channel vector from node A to node B may be denoted as:

$$h_{B,A} = [h_{B,A}(1), h_{B,A}(2), \ldots]^T. \quad \text{(Equation 3)}$$

It will be understood that $h_{A,B}$, $h_{B,E}$, and $h_{A,E}$ may be defined similarly or correspondingly.

In a method of generating a secret key according to various example embodiments, at the transmitting side, node A is configured to utilize time-frequency features extracted from $h_{B,A}$ and then utilize a cryptographic function to generate a secret key $k_A = f(h_{B,A})$. For example, when node A desires to communicate a message $m_A$ to node B, node A encrypts the message $m_A$ with the secret key $k_A$ and transmit enc($m_A$, $k_A$) to node B. At the receiving side, node B then uses its corresponding secret key $k_B$ to decrypt the encrypted message. In this regard, correspondingly, node B uses the agreed time-frequency features (e.g., verified with the time-frequency features received from node A) and cryptographic function to generate the secret key $k_B = f(h_{A,B})$. Similarly, when node B desires to communicate a message $m_B$ to node A, node B encrypts the message $m_B$ with the secret key $k_B$ and then transmit the encrypted message to node A. In this regard, due to the channel reciprocity, $h_{B,A} \approx h_{A,B}$. Therefore, with appropriate channel estimation calibration and feature extraction according to various example embodiments of the present invention, the generated secret keys $k_A$ and $k_B$ are identical. Accordingly, nodes A and B are advantageously able to exchange data (information) confidentially without sharing (or having to transmit) the secret key.

In various example embodiments, the method of generating a secret key may generally be considered to include four main steps or stages, namely, a channel estimation stage, a key bit generation stage, a key reconciliation stage, and a privacy amplification stage.

At the channel estimation stage, both nodes A and B may send pilot packets to probe the channel therebetween. Each node may then sample the received pilot packets and estimate the channel using their respective channel estimator. For example, under a time division multiplexing access (TDMA) system, the channel from nodes A to B and nodes B to A are reciprocal given that the delay and sampling offset is sufficiently small.

At the key bit generation stage, nodes A and B may both use indexed features (indexed time-frequency features) to generate the (random) key bits using a threshold. For example, if the value of a time-frequency feature at an index satisfies a certain condition (e.g., is within a certain range), then a corresponding bit may be assigned to that index. In this manner, a bit sequence may be generated based on the plurality of time-frequency features in in the time-frequency matrix.

In relation to the key reconciliation stage, for example, due to the channel randomness and hardware variations, the bit sequences obtained at nodes A and B, respectively, may be different in certain parts/regions. To address this possible bit discrepancies, example embodiments provide the key reconciliation stage configured such that nodes A and B exchange information (e.g., node A sends its generated bit sequence to node B or vice versa) to reconcile the bit discrepancies between their generated bit sequences.

In relation to the privacy amplification stage, for example, if error correcting information is exchanged between a transmitter and a receiver, an eavesdropper may be able to guess portions of the generated bit sequence. To address this possible security issue, a privacy enhancement technique may be employed, such as subjecting the bit sequence to a cryptographic function.

In relation to the key bit generation stage, given the channel estimations at the legitimate users (nodes), for example, conventional techniques/approaches have only been found to utilize either the time domain or frequency domain of the channel estimate to generate the secret key. The parameters considered in such one-dimensional approaches are, for example, the received signal strength (RSS) or phase, channel fade duration and level crossing, or magnitude of the discrete Fourier transform. In this regard, since conventional approaches only utilize one dimension of the channel estimate, the accompanying conventional secret key generation algorithms/techniques are also restricted into one dimension only. As a result, conventional secret key generation techniques may suffer in various performance metrics, such as bit generation rate, bit agreement ratio, and secured bit ratio. For example, conventional techniques utilizing only the time domain may lose information, may generate a shorter key and may be inefficient. Furthermore, such conventional techniques may also be vulnerable to manipulative adversary such as an adversary sending a strong signal to force the channel to follow a particular pattern.

In contrast, various example embodiments provide a method of generating a secret key that utilizes both the time and frequency domains, which has been found to achieve a more efficient key bit generation as well as improving key security. As an example, the method may apply discrete Gabor transformation (DGT) to extract both the global and local information from the channel estimate. The output of the DGT may be a Gabor coefficient matrix with the time and frequency indexes, which may then be used for key bit generation. In this regard, utilizing both the time and frequency dimensions has been found to enhance the bit generation rate as well as the security of the keys.

It should be noted that in relation to the time-frequency matrix, it is conventionally unclear or unknown how one may generate the secret bit sequence effectively. As an example, the time-frequency matrix may be vectorized into a vector and a one-dimensional algorithm may be applied to extract the secret bit sequence, however, such an approach does not take advantage of the integrated nature of time-frequency space. Therefore, for example, due to the lack of conventional teachings and/or the lack of a technical solution in the conventional art, conventional approaches of generating a secret key has been found to be restricted to utilizing only one dimension of the channel estimate. In contrast, various embodiments of the present invention go against conventional understanding and provide the technical solution to enable the generation of a secret key that utilizes both the time and frequency domains, in an effective and a secured manner. For example, various example embodiments provide a 2-D excursion technique/algorithm configured to extract the key bits from the integrated time-frequency space. In this regard, the excursion technique scans both time and frequency domains and assigns key bits only for appropriate regions (e.g., assigned to indexes at which the corresponding time-frequency features satisfies a predetermined condition). For example, the excursion technique thus reduces the bit disagreement probability between legitimate users, compared to conventional one-dimensional techniques.

The key bit generation stage based on time-frequency features will now be described in further details according to various example embodiments of the present invention. The DGT of the channel estimate and the 2-D excursion technique/algorithm configured to extract the secret bits from both time and frequency domains will also be described below in further details according to various example embodiments of the present invention. In addition, for illustration purpose only, exemplary practical architectures will also be described below in further details as examples of implementation of the secret key generation method in a practical wireless communication systems.

Time-Frequency Feature (Information) Extraction

For example, using only the signal strength and/or phase in the time domain or magnitudes of the frequency spectra only exploits part of the observed information. In contrast, as described hereinbefore, various example embodiments of the present invention perform a time-frequency analysis for extracting both time and frequency information from the channel estimates. For better understanding of the present invention and without limitation or loss of generality, various example embodiments of the present invention will now be described with respect to the time-frequency transformation being the discrete Gabor transformation (DGT) by way of an example only and without limitation. That is, the application of the DGT will now be assumed for the time-frequency transformation. However, it will be appreciated by a person skilled in the art that the present invention is not limited to the DGT being applied, and any other types of time-frequency transformation that is able to create a 2-D time-frequency matrix are also within the scope of the present invention, such as but not limited to, short-time Fourier transform (STFT), S transform, and so on.

The DGT of a channel estimate $h_X$, where "X" denotes either "B, A" (i.e., node B to node A) or "A, B" (i.e., node A to node B), may be calculated as:

$$G_{m,k} = \sum_{n=1}^{MN} h_X(n) W^*(n - mN) \exp\left(-i2\pi \frac{kn}{K}\right), \quad \text{(Equation 4)}$$

where $m \in \{1, 2, \ldots, M\}$ for M total shifts; $k \in \{0, 1, \ldots, K-1\}$ with mod(MN, K)=0 and N≤K, i.e., oversampling; $h_x(n)$ is the n-th element of the vector $h_x$; $G_{m,k}$ is the (m,k)-th DGT coefficients; W(n) is the analysis window; and N is the number of shifted samples. Note that due to the module operator, the following equations may be obtained:

$$h_x(n+lMN) = h_x(n), \quad \text{(Equation 5)}$$

$$W(n+lMN) = W(n). \quad \text{(Equation 6)}$$

The oversampling criterion N≤K may be desirable when processing noisy data. Furthermore, for example, the analysis window W(n) may be the Gaussian synthesis window.

Time-frequency features obtained from the time-frequency matrix $\{G_{m,k}\}$ may then be used to generate the secret key. By way of an example and without limitation or loss of generality, the time-frequency features may be the normalized magnitude-square Gabor coefficients $\overline{|G_{m,k}|^2} \in [0, 1]$, which are used to generate the secret key. However, it will be appreciated by a person skilled in the art that the present invention is not limited to the time-frequency features being the normalized magnitude-square Gabor coefficients, and any other types of time-frequency features as desired or as appropriate are also within the scope of the present invention, such as but not limited to, the real/imaginary part or phase of the time-frequency matrix $\{G_{m,k}\}$.

Two-Dimensional Excursion Bit Generation Technique

A key bit generation technique based on the time-frequency features (the normalized magnitude-square Gabor coefficients) will now be described, in particular, a two dimensional (2-D) excursion technique.

As a first step, the level crossing thresholds at nodes A and B may be defined. Let $G_A$ and $G_B$ denote the time-frequency matrices (the Gabor coefficient matrices) consisting of $\{\overline{|G_{m,k}|^2}\}$, which are obtained at nodes A and B, respectively. At node A, to avoid mismatches in the generated bits, two thresholds $q_{A,+}$ and $q_{A,-}$ are employed to produce a binary sequence. In various example embodiments, a "1" bit is assigned to an index (m,k) (which may also be referred to as an index pair) of the time-frequency matrix at which $G_A(m, k) \geq q_{A,+}$, or a "0" bit is assigned to the index if $G_A(m, k) \leq q_{A,-}$, m ∈ {1, 2, ..., M} and k ∈ {1, 2, ..., K}. If $G_A(m, k)$ at an index is between the above-mentioned two thresholds, no bit is assigned to the index, or the $G_A(m, k)$ at the index (indexed time-frequency feature) is simply discarded. In various example embodiments, the above-mentioned two threshold levels may be determined as:

$$q_{A,+} = \text{mean}(G_A) + \alpha * \text{std}(G_A), \quad \text{(Equation 7)}$$

$$q_{A,-} = \text{mean}(G_A) - \alpha * \text{std}(G_A), \quad \text{(Equation 8)}$$

where mean(X) and std(X) denote the average deviation and standard deviation computed on all elements of a matrix X, and α denotes a parametrical factor which may be adjusted to vary the thresholds. The thresholds ($q_{B,+}$, $q_{B,-}$) at node B may be determined and the assignment of bits may be performed in the same or similar manner as described above with respect to node B.

According to various example embodiments, the 2-D time-frequency excursion technique may include the following steps:

1) Both nodes A and B define the excursion windows $w_{x,e}$ and $w_{y,e}$ for the x- and y-axis, respectively. For example, the excursion windows $w_{x,e}$ and $w_{y,e}$ may be predetermined beforehand or exchanged via a public channel.

2) Nodes A and B each calculate the two thresholds $q_{A/B,+/-}$.

3) Node A then locates all disjoint subsets of indexes {$m_s$, $m_e$, $k_s$, $k_e$} that satisfy $G_A(m, k) \geq q_{A,+}$ (or $G_A(m, k) \leq q_{A,-}$), ∀m ∈ {$m_s$, $m_s+1$, ..., $m_e$} and k ∈ {$k_s$, $k_s+1$, ..., $k_e$}. Node A then sends the index pair $$\left(\left\lfloor \frac{m_s + m_e}{2} \right\rfloor, \left\lfloor \frac{k_s + k_e}{2} \right\rfloor\right)$$

to node B via a public channel.

4) For each received index pair ($m_r$, $k_r$) at node B, node B checks (verifies) whether $$G_B(m, k) \geq q_{B,+} (\text{or} \leq q_{B,-}),$$

$$\forall m \in \left\{m_r - \left\lfloor \frac{w_{x,e} - 2}{2} \right\rfloor, \ldots, m_r + \left\lfloor \frac{w_{x,e} - 2}{2} \right\rfloor\right\} \text{ and}$$

$$k \in \left\{k_r - \left\lfloor \frac{w_{y,e} - 2}{2} \right\rfloor, \ldots, k_r + \left\lfloor \frac{w_{y,e} - 2}{2} \right\rfloor\right\}.$$

Based on the verification, node B produces a set of all feasible index pairs (verified/agreed set of identified indexes) and sends the agreed set to node A via a public channel.

5) Based on the agreed set of indexes, nodes A and B each generates a bit sequence and subsequently the secret key based on the bit sequence.

In the above 2-D time-frequency excursion technique described, the subscripts "s", "e", and "r" denote starting, ending, and received, respectively.

For illustration purpose only and without limitation, FIG. 6 show an example pseudo-code for a 2-D time-frequency excursion technique according to an example embodiment of the present invention. The example pseudo-code was applied for various experiments conducted as will be described below to demonstrate the performances of the technique.

Figure 7A:
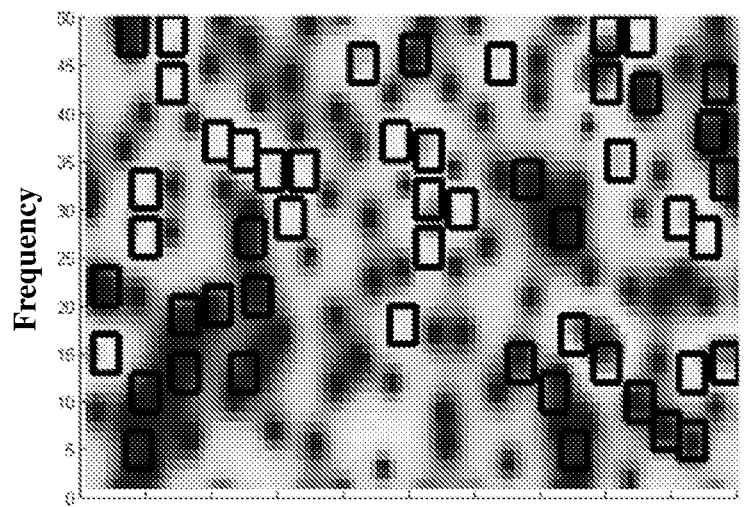
FIGS. 7A to 7C depict plots of example time-frequency matrices derived for three estimated channels, namely, channel A→B, channel B→A, and channel A→E, at node A, node B, and node E, respectively, according to an example embodiment of the present invention.
Figure 7B:
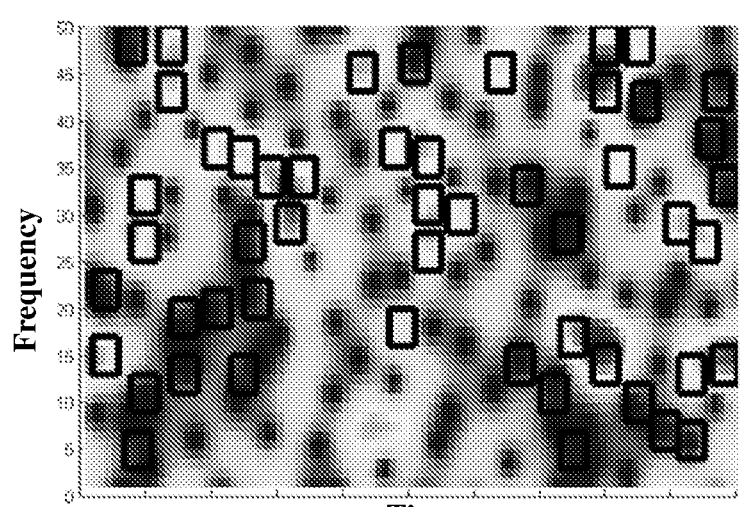
Figure 7C:
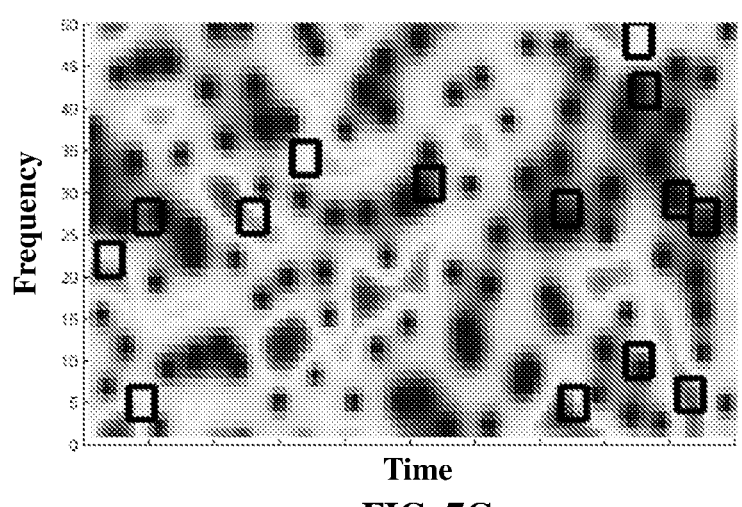
Figure 8A:
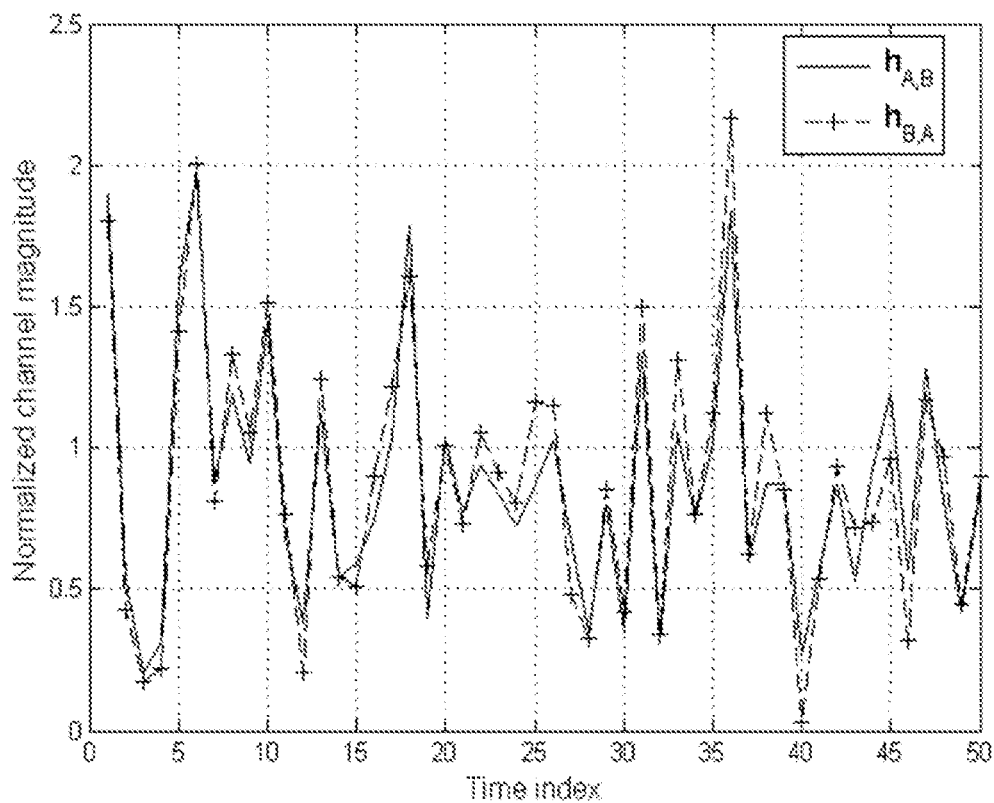
FIGS. 8A and 8B depict example estimated channel responses between nodes A and B and the estimated channel responses from nodes A to B and nodes A to E, respectively.
Figure 8B:
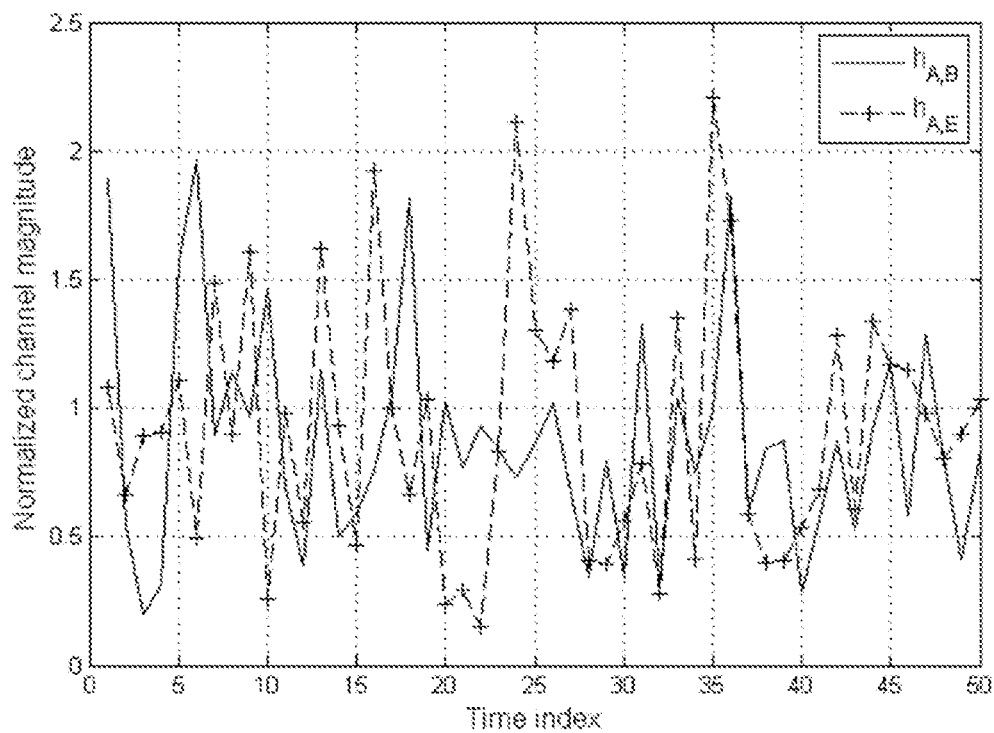

FIGS. 7A to 7C depict plots of the time-frequency matrices (including Gabor coefficients) derived for three estimated channels, namely, channel A→B, channel B→A, and channel A→E, at node A, node B, and node E, respectively, (see FIG. 5) according to an experiment performed, along with the indexes of the time-frequency matrices (shown as boxed regions) identified by the 2-D time-frequency excursion algorithm shown in FIG. 6 for generating the secret bits. The results shown are based on real measurements in the experiment and the eavesdropper is 20 cm away from node B. As a reference or for comparison purposes, the estimated channel responses between nodes A and B and the estimated channel responses from nodes A to B and nodes A to E are shown in FIGS. 8A and 8B, respectively. As can be seen from FIG. 8A, due to the channel reciprocity, the magnitudes of the Gabor coefficients for A→B and B→A channel estimates are relatively similar. In this regard, it is noted according to various example embodiments that since the magnitudes are not exactly identical, the threshold sets {$q_{A,+}$, $q_{A,-}$} and {$q_{B,+}$, $q_{B,-}$} are slightly different. As a result, the raw bits obtained at A and B may also different in certain positions. Furthermore, there may exist long strings of "1" and "0", which reduces the randomness of the generated bit sequences (bit strings).

In this regard, the 2-D excursion-based bit generation technique according to various example embodiments helps to alleviate such a problem. In the experiment, it was observed that the final bit sequences generated at nodes A and B, respectively, exactly matched without long identical bit strings. In this regard, although the length of the generated bit sequences may be significantly reduced especially when $w_{x,e}$ and $w_{y,e}$ are large, the generated bit sequences are identical and more stochastic.

Figure 9:
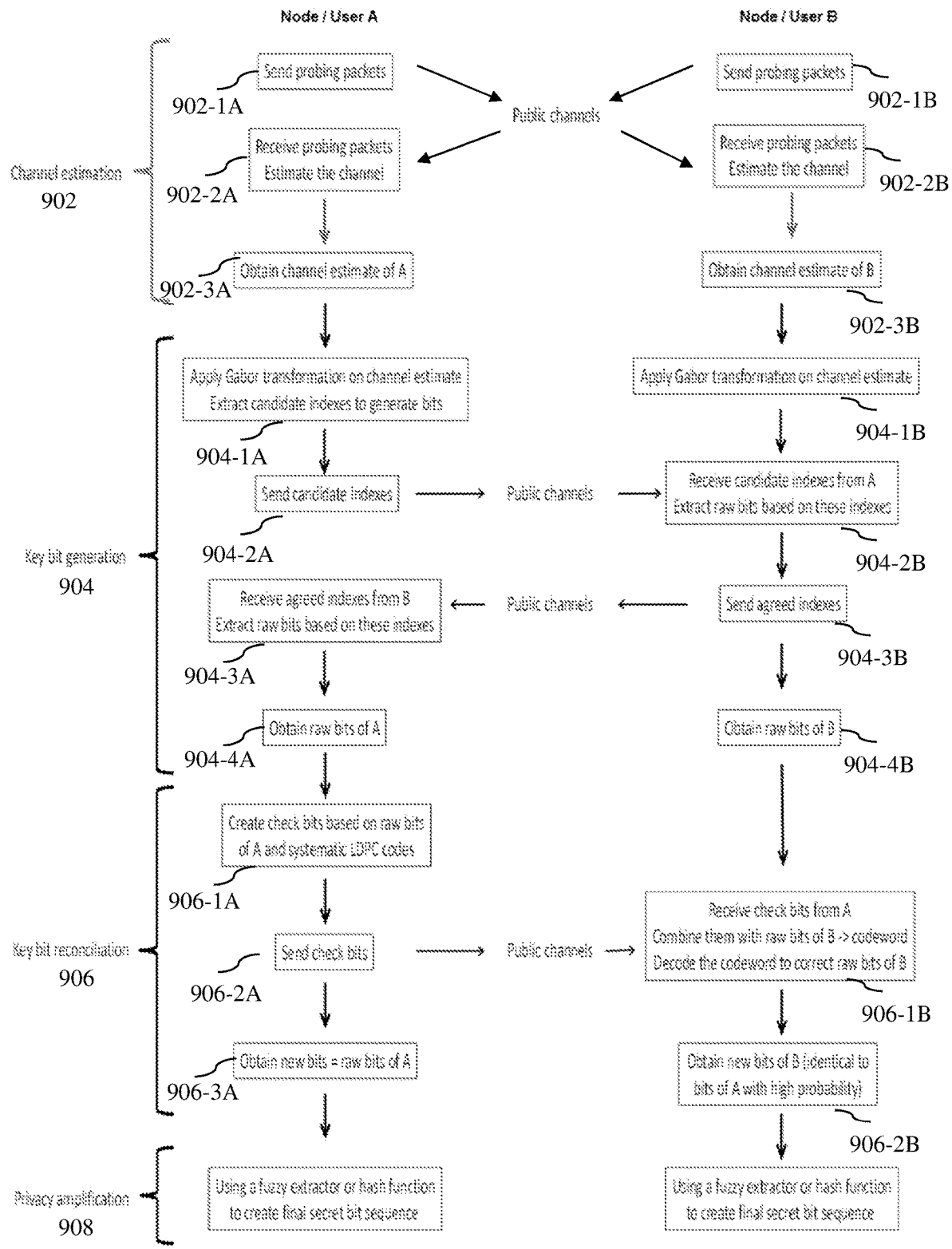
FIG. 9 depicts a flow diagram showing an example overview of a method for generating a secret key at both nodes A and B according to various example embodiments of the present invention.

FIG. 9 depicts a flow diagram showing an example overview of a method for secret key generation at both nodes A and B according to various example embodiments of the present invention, along with the information/data exchanges therebetween. For example, FIG. 9 shows in further details the four main parts or stages (namely, the channel estimation stage 902, the key bit generation stage 904, the key reconciliation stage 906, and the privacy amplification stage 908) of the method of generating a secret key as described hereinbefore.

At the channel estimation stage 902, nodes A and B send a probing signal (probing packets) to each other through a wireless communication channel (step 902-1A, 902-1B); nodes A and B each receives the respective probing signal (step 902-2A, 902-2B), and nodes A and B (step 902-3A, 902-3B) each obtains a channel estimate of the wireless communication channel based on the respective probing signal received.

At the key bit generation stage 904, both nodes A and B each performs a time-frequency transformation (e.g., Gabor transformation) to obtain a time-frequency matrix associated with the wireless communication channel (step 904-1A, 904-1B). At node A, step 904-1A further obtains a set of identified indexes (candidate set of identified indexes) based on the time-frequency matrix (e.g., node A performs the "A side" of the 2-D time-frequency excursion algorithm shown in FIG. 6). At step 904-2A, node A sends the candidate set of identified indexes to node B for verification. At step 904-2B, node B receives the candidate set of identified indexes from node A and obtains an agreed (or verified) set of identified indexes based on the received candidate set of identified indexes from node A and the time-frequency matrix at node B (e.g., node B performs the "B side" of the 2-D time-frequency excursion algorithm shown in FIG. 6). At step 904-3B, node B then sends the agreed set of identified indexes to node A, of which node A receives at step 904-3A. At step 904-4A, 904-4B, nodes A and B each obtains a first bit sequence (e.g., raw bit sequence) based on the agreed set of identified indexes and the respective time-frequency matrix.

At the key bit reconciliation stage 906, node A generates parity check bits using an LDPC code on the raw bit sequence generated (step 906-1A). At step 906-2A, node A then sends the parity check bits to node B, of which is received at node B at step 906-1B. Furthermore, at step 906-1B, the raw bit sequence at node B is combined with the parity check bits received to form a codeword, which is then subjected to LDPC decoding to generate a second bit sequence (e.g., a reconciled bit sequence) at node B. In this regard, the LDPC decoding is performed to correct discrepancies between the raw bit sequences generated at nodes A and B. As a result, a reconciled bit sequence is obtained at nodes A and B at step 906-3A, 906-2B. In this regard, the reconciled bit sequence at node A is the raw bit sequence previously generated at node A, and the reconciled bit sequence at node B is the bit sequence at node B after being corrected at step 906-1B. As a result, the reconciled bit sequences obtained at nodes A and B have a high probability of being identical.

At the privacy amplification stage 908, the reconciled bit sequence obtained at nodes A and B is subjected to a cryptographic function (e.g., a fuzzy extractor or a hash function) to obtain a third bit sequence (e.g., a final bit sequence). In this regard, for example, the reconciled bit sequence obtained at both nodes A and B may have some correlations since they are linked with known parameters m, k. Therefore, the privacy amplification stage 908 functions to randomize the reconciled bit sequence so as to decrease such correlations.

Accordingly, in the various example embodiments, all of the four main stages are implemented for generating the secret keys at both nodes A and B.

For the key bit reconciliation stage 906, for example, an LDPC code may be used with code rate ½ and code length 648 bits, i.e., the LDPC code of IEEE 802.11n WiFi standard. However, it will be appreciated by a person skilled in the art that the code rate is adjustable accordingly based on the signal-to-noise ratio (SNR) of the estimated channel. If the SNR is high, the channel estimates at the nodes may be sufficiently accurate, and the difference may thus be small. In one example, a higher code rate is selected, e.g., ⅔ or ¾, for the LDPC reconciliation in the interest of minimizing key sequence disagreement between the two nodes.

Accordingly, it will be appreciated that the method of generating a secret key (or the secret key generator thereof) as described according to various embodiments of the present invention may be implemented in various devices or systems as desired or as appropriate, as long as there may be a desire or need to generate a secret key for encrypting data and/or decrypting encrypted data.

Figure 10:
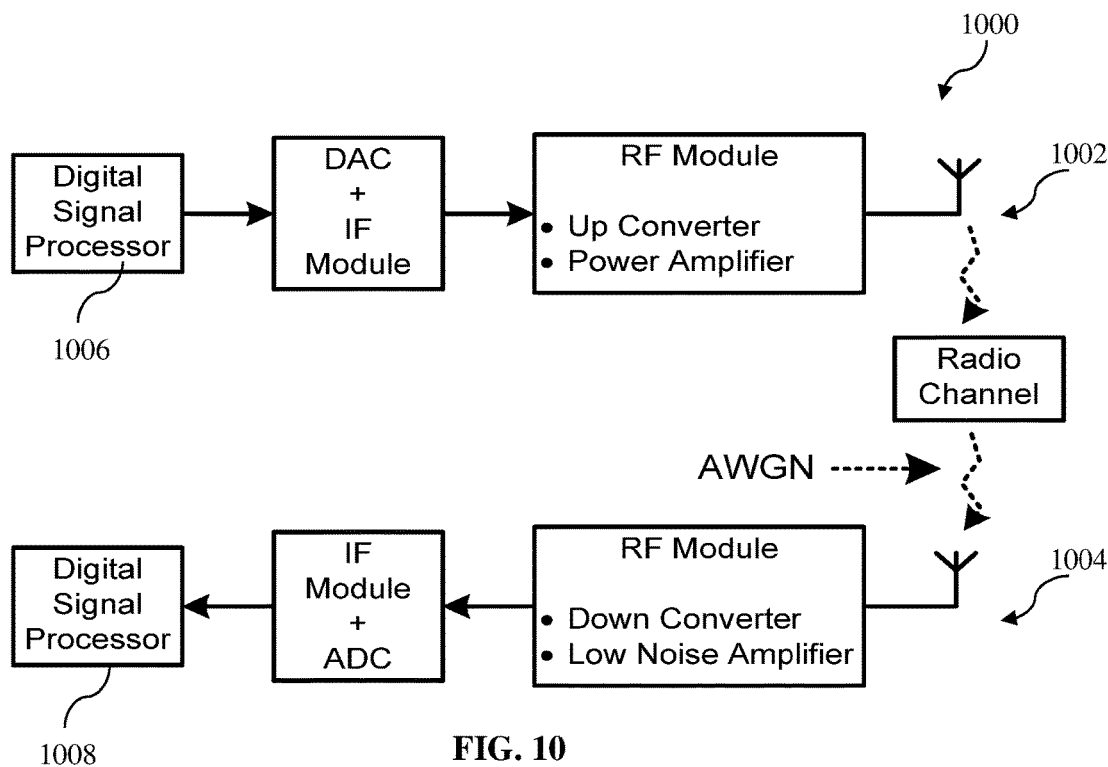
FIG. 10 depicts a schematic block diagram of a wireless communication system comprising a transmitter and a receiver, whereby the transmitter and the receiver each includes a secret key generator according to various embodiments of the present invention.

As an example, FIG. 10 depicts a schematic block diagram of a wireless communication system 1000 comprising a transmitter 1002 and a receiver 1004. In the example, a secret key generator as described herein according to various embodiments of the present invention may be implemented as a component in each of the digital signal processor 1006 of the transmitter 1002 and the digital signal processor 1008 of the receiver 1004. At the transmitter 1002, the secret key generator may be configured to generate a secret key to encrypt data before being transmitted to the receiver 1004. At the receiver 1004, the secret key generator may be configured to generate a secret key to decrypt the encrypted data received from the transmitter 1002.

Figure 11:
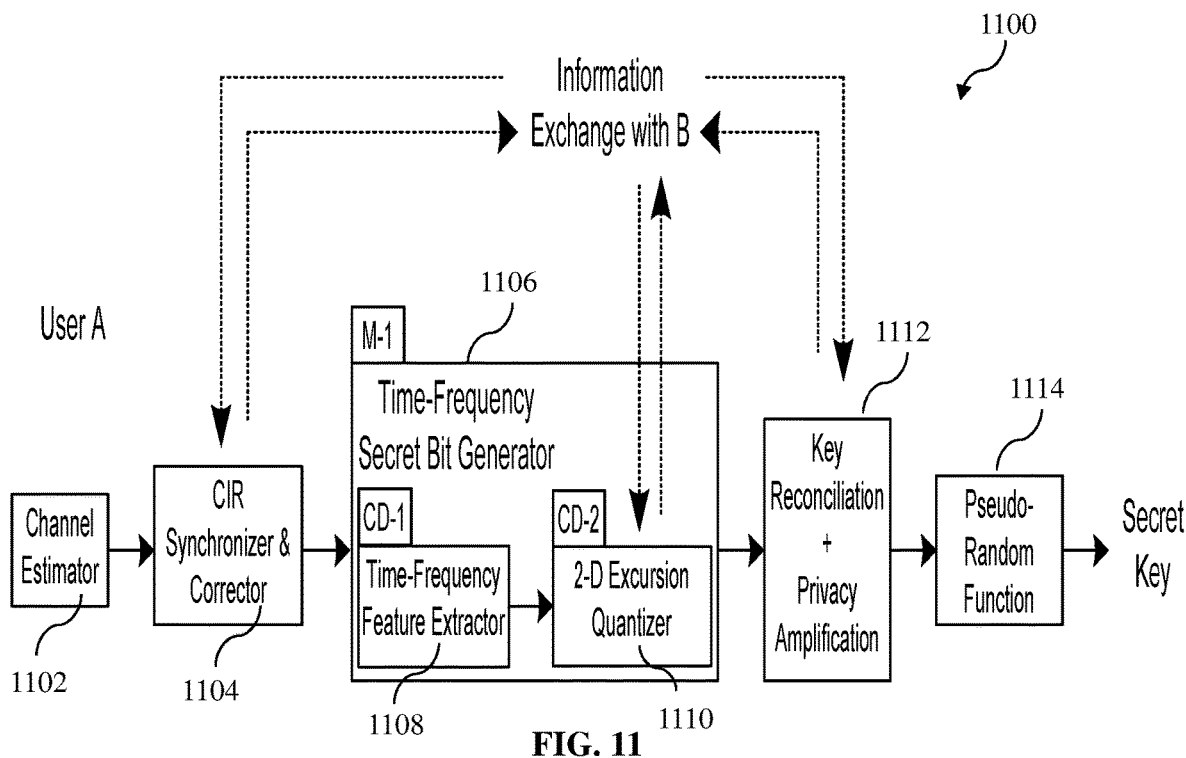
FIG. 11 depicts a schematic block diagram of an example secret key generator architecture at node A configured to implement a secret key generation method according to various example embodiments of the present invention.

FIG. 11 depicts a schematic block diagram of an example secret key generator architecture 1100 at node A configured to implement the secret key generation method based on joint time-frequency features as described herein according to various example embodiments of the present invention. It will be appreciated by a person skilled in the art that the same or a corresponding secret key generator architecture 1100 may also be implemented at node B for generating a secret key at node B. In the example, the channel estimator 1102 is configured to estimate the channel impulse response (CIR) from the pilot/training signals. The CIR synchronizer and corrector 1104 is configured to minimize the disparity between nodes A and B's CIRs. The time-frequency secret bit generator 1106 (corresponding to the key generator as described herein according to various embodiments of the present invention) comprises a time-frequency feature extractor 1108 and a 2-D excursion quantizer 1110. The time-frequency feature extractor 1108 is configured to receive the corrected CIR and extract time-frequency features from the joint time-frequency domain, and the 2-D excursion quantizer 1110 is configured to generate a bit sequence based on the time-frequency features extracted from the time-frequency feature extractor 1108. The raw bit sequence output from the time-frequency secret bit generator 1106 may then be reconciled by exchanging information with node B (e.g., based the key bit reconciliation stage as described hereinbefore according to various example embodiments), and then amplified to create a seed by the key reconciliation and privacy amplification module 1112. The seed may then be fed to the pseudo-random function 1114 to generate the secret key for node A.

Figure 12A:
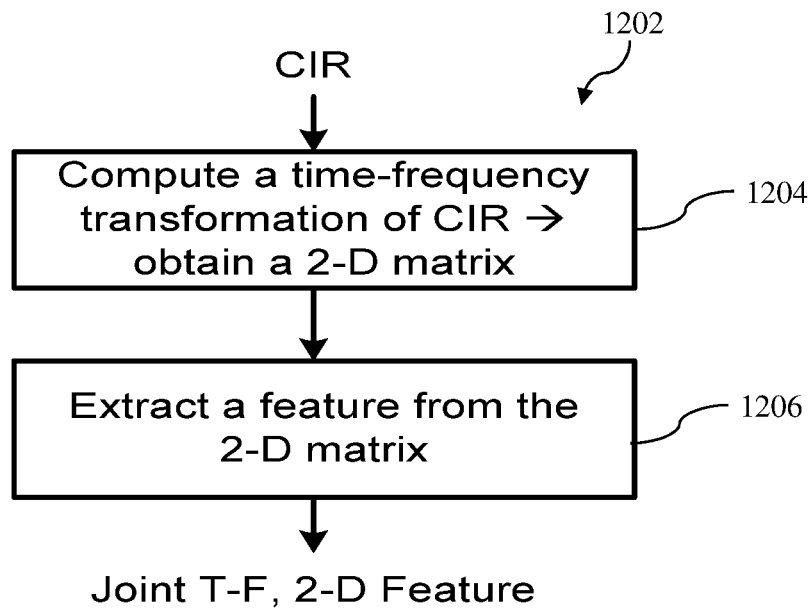
FIG. 12A depicts an example flow diagram associated with the time-frequency feature extractor shown in FIG. 11 according to various example embodiments of the present invention.
Figure 12B:
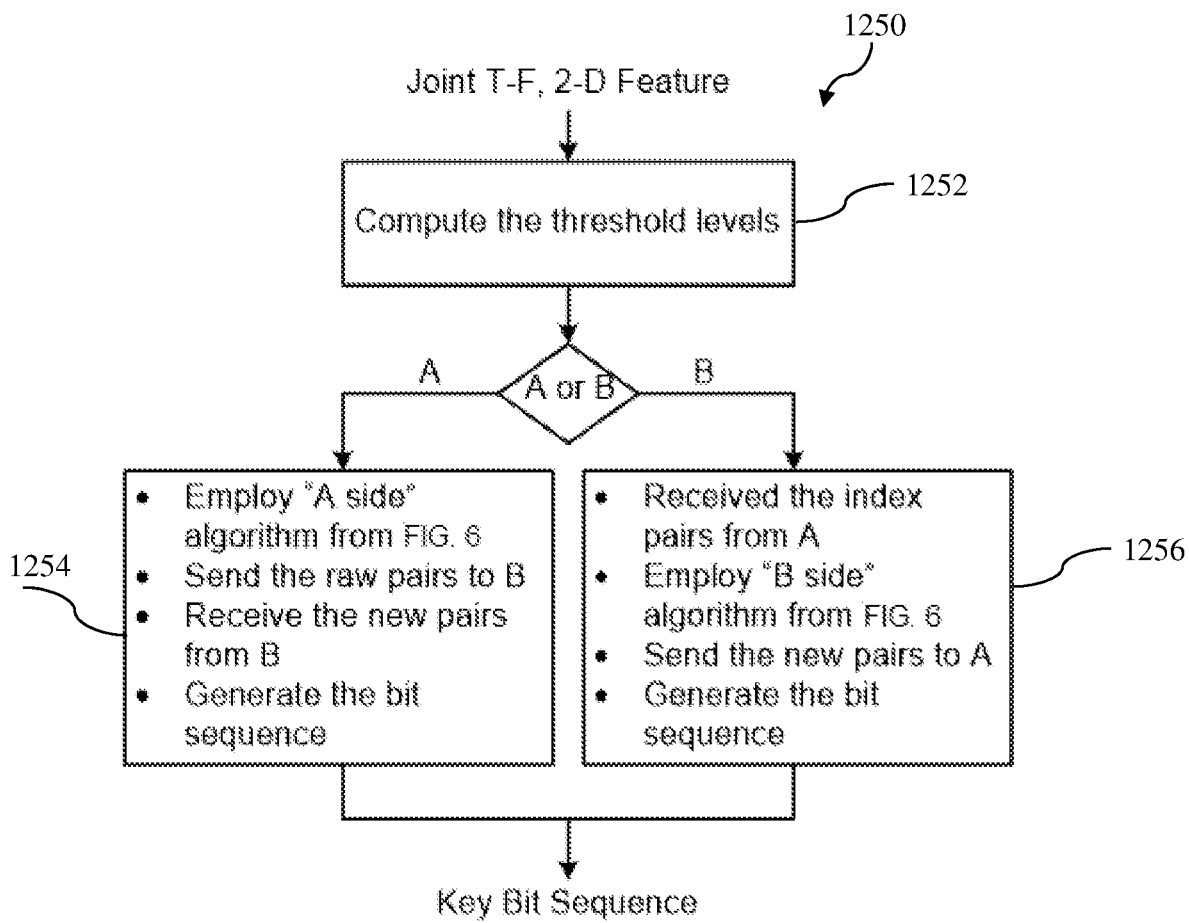
FIG. 12B depicts an example flow diagram associated with the 2-D excursion quantizer 1110 shown in FIG. 12 according to various example embodiments of the present invention.

As described above, the time-frequency secret bit generator 1106 comprises a time-frequency feature extractor 1108 and a 2-D excursion quantizer 1110. For illustration purpose only, according to various example embodiments of the present invention, FIG. 12A depicts an example flow diagram 1202 associated with the time-frequency feature extractor 1108 configured for extracting joint time-frequency features, including a step 1204 of computing a time-frequency transformation of the channel estimate (e.g., CIR) to obtain a 2-D time-frequency matrix and a step 1206 of extracting time-frequency features from the 2-D time-frequency matrix. FIG. 12B depicts an example flow diagram 1250 associated with the 2-D excursion quantizer 1110 configured for generating a secret key bit sequence, including a step 1252 of computing threshold levels at both nodes A and B, and a step of generating a reconciled bit sequence at node A (step 1254) and node B (step 1256).

In various example embodiments, the bit generation rate may be defined as the number of bits generated from a channel realization, the bit disagreement probability may be defined as the number of different bits between two users (nodes) compared with (e.g., divided by) the number of generated bits, and the compromised ratio may be defined as the number of identical bits between a user (node) and an eavesdropper (node) compared with (e.g., divided by) the number of generated bits.

Figure 13A:
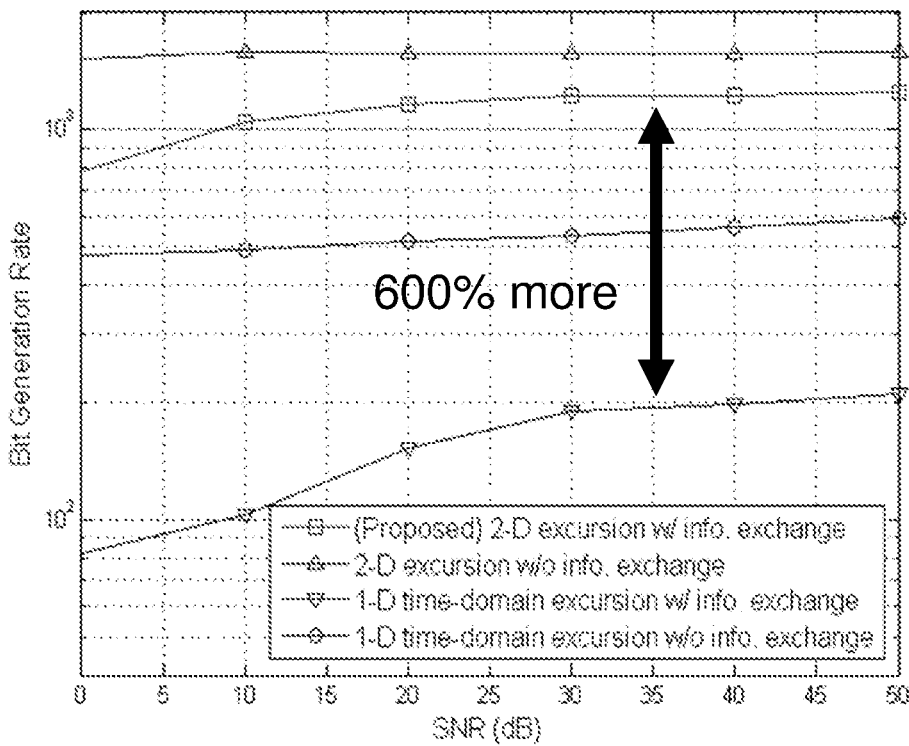
FIG. 13A depicts a plot of the bit generation rate vs the SNR (dB) for four bit generation (excursion) techniques.
Figure 13B:
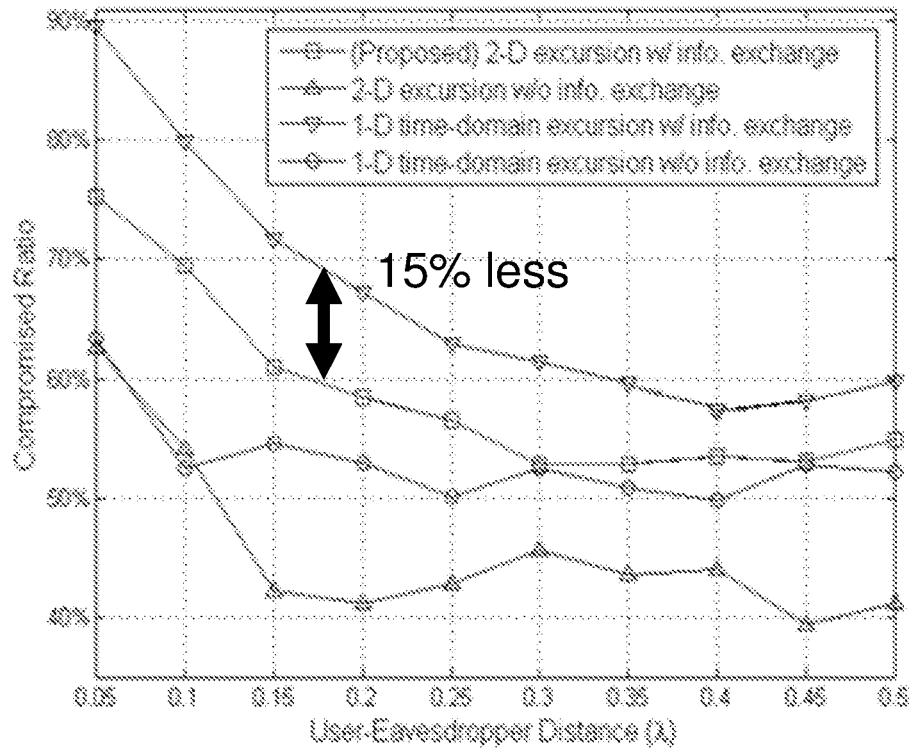
FIG. 13B depicts a plot of the compromised ratio vs the user-eavesdropper distance ($\lambda$) for the above-mentioned four bit generation techniques.
Figure 13C:
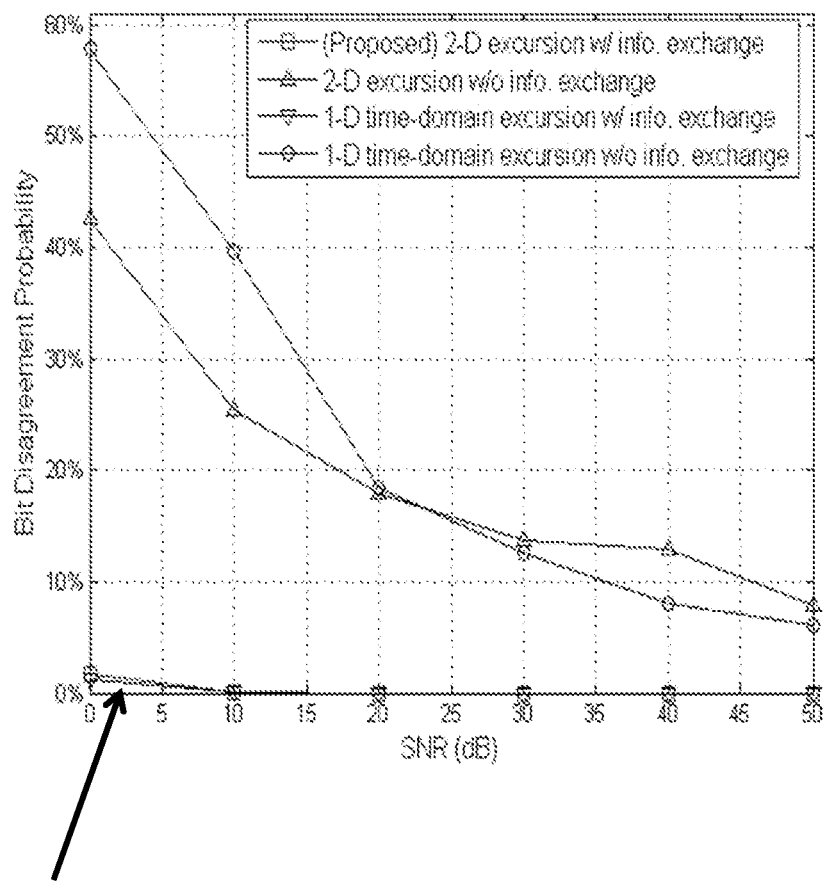
FIG. 13C depicts a plot of the bit disagreement probability vs SNR (dB) of the above-mentioned four bit generation techniques.

FIGS. 13A to 13C depict plots illustrating various performance metrics of techniques according to various embodiments of the present invention compared with conventional one-dimensional approaches for generating a secret key. In particular, in relation to FIGS. 13A to 13C, the following techniques are compared: a present first technique of 2-D time-frequency excursion with information exchange according to various example embodiments of the present invention, a present second technique of 2-D time-frequency excursion without information exchange according to various example embodiments of the present invention, a conventional third technique of 1-D time-domain excursion with information exchange, and a conventional fourth technique of 1-D time-domain excursion without information exchange.

FIG. 13A depicts a plot of the bit generation rate vs the SNR (dB) of the above-mentioned four techniques. It can be observed that the present first and second techniques performed significantly better (up to 600% better) than the conventional third and fourth techniques. FIG. 13B depicts a plot of the compromised ratio vs the user-eavesdropper distance (λ) of the above-mentioned four techniques. It can be observed that, for example, the present first technique has a noticeably lower compromised ratio compared with the third conventional technique. FIG. 13C depicts a plot of the bit disagreement probability vs SNR (dB) of the above-mentioned four techniques. It can be observed that the present first technique has a near zero bit disagreement probability. Accordingly, for example, the present first technique possesses a number of advantages, such as an improved key bit generation rate, a lower compromised ratio, as well as a near zero bit disagreement probability.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of generating a secret key at a first node for data communication between the first node and a second node, the method comprising:
   obtaining a channel estimate of a communication channel between the first and second nodes;
   obtaining a time-frequency matrix associated with the communication channel based on a time-frequency transformation of the channel estimate; and
   producing the secret key based on the time-frequency matrix, wherein said obtaining the channel estimate comprises:
      receiving, at the first node, a training signal from the second node via the communication channel; and
      determining the channel estimate based on the received training signal, the time-frequency matrix comprises a plurality of time-frequency features, each time-frequency feature associated with a respective index of the time-frequency matrix, and
   said obtaining the time-frequency matrix comprises:
      determining a plurality of time-frequency transformation coefficients based on the time-frequency transformation of the channel estimate; and
      determining the plurality of time-frequency features based on the plurality of time-frequency transformation coefficients.

2. The method according to claim 1, wherein said producing the secret key comprises:
   determining, for each index of the time-frequency matrix, whether the corresponding time-frequency feature at the index satisfies a predetermined condition; and
   producing the secret key based on said determining, for each index of the time-frequency matrix, whether the corresponding time-frequency feature at the index satisfies the predetermined condition.

3. The method according to claim 2, wherein said producing the secret key further comprises:
   identifying each index of the time-frequency matrix at which the corresponding time-frequency feature satisfies the predetermined condition to obtain a set of identified indexes;
   sending the set of identified indexes to the second node for verification;
   receiving a verified set of identified indexes from the second node based on the verification performed at the second node with respect to the set of identified indexes; and
   producing the secret key based on the verified set of identified indexes.

4. The method according to claim 3, wherein said producing the secret key further comprises:
   obtaining a first bit sequence based on the verified set of identified indexes;
   performing bit reconciliation on the first bit sequence with the second node to obtain a second bit sequence; and
   producing the secret key based on the second bit sequence.

5. The method according to claim 4, wherein said producing the secret key further comprises subjecting the second bit sequence to a cryptographic function to obtain a third bit sequence.

6. The method according to claim 5, wherein said producing the secret key further comprises subjecting the third bit sequence as a seed to a pseudo-random function to produce the secret key at the first node.

7. The method according to claim 6, wherein:
the time-frequency transformation is a discrete Gabor transformation of the channel estimate; and
the plurality of time-frequency features is obtained based on a plurality of Gabor transformation coefficients derived from the discrete Gabor transformation.

8. A key generator for generating a secret key at a first node for data communication between the first node and a second node, the secret key generator comprising:
a memory; and
at least one processor communicatively coupled to the memory and configured to:
obtain a channel estimate of a communication channel between the first and second nodes;
obtain a time-frequency matrix associated with the communication channel based on a time-frequency transformation of the channel estimate; and
produce the secret key based on the time-frequency matrix, wherein to obtain the channel estimate, the at least one processor is further configured to:
receive, at the first node, a training signal from the second node via the communication channel; and
determine the channel estimate based on the received training signal,
the time-frequency matrix comprises a plurality of time-frequency features, each time-frequency feature associated with a respective index of the time-frequency matrix, and
to obtain the time-frequency matrix, the at least one processor is further configured to:
determine a plurality of time-frequency transformation coefficients based on the time-frequency transformation of the channel estimate; and
determine the plurality of time-frequency features based on the plurality of time-frequency transformation coefficients.

9. The key generator according to claim 8, wherein to produce the secret key, the at least one processor is further configured to:
determine, for each index of the time-frequency matrix, whether the corresponding time-frequency feature at the index satisfies a predetermined condition; and
produce the secret key based on said determining, for each index of the time-frequency matrix, whether the corresponding time-frequency feature at the index satisfies the predetermined condition.

10. The key generator according to claim 9, wherein to produce the secret key, the at least one processor is further configured to:
identify each index of the time-frequency matrix at which the corresponding time-frequency feature satisfies the predetermined condition to obtain a set of identified indexes;
send the set of identified indexes to the second node for verification;
receive a verified set of identified indexes from the second node based on the verification performed at the second node with respect to the set of identified indexes; and
produce the secret key based on the verified set of identified indexes.

11. The key generator according to claim 10, wherein to produce the secret key, the at least one processor is further configured to:
obtain a first bit sequence based on the verified set of identified indexes;
perform bit reconciliation on the first bit sequence with the second node to obtain a second bit sequence; and
produce the secret key based on the second bit sequence.

12. The key generator according to claim 11, wherein to produce the secret key, the at least one processor is further configured to subject the second bit sequence to a cryptographic function to obtain a third bit sequence.

13. The key generator according to claim 12, wherein to produce the secret key, the at least one processor is further configured to subject the third bit sequence as a seed to a pseudo-random function to produce the secret key at the first node.

14. A computer program product, embodied in one or more non-transitory computer-readable storage mediums, comprising instructions executable by at least one processor to perform a method of generating a secret key at a first node for data communication between the first node and a second node, the method comprising:
obtaining a channel estimate of a communication channel between the first and second node;
obtaining a time-frequency matrix associated with the communication channel based on a time-frequency transformation of the channel estimate; and
producing the secret key based on the time-frequency matrix, wherein said obtaining the channel estimate comprises:
receiving, at the first node, a training signal from the second node via the communication channel; and
determining the channel estimate based on the received training signal,
the time-frequency matrix comprises a plurality of time-frequency features, each time-frequency feature associated with a respective index of the time-frequency matrix, and
said obtaining the time-frequency matrix comprises:
determining a plurality of time-frequency transformation coefficients based on the time-frequency transformation of the channel estimate; and
determining the plurality of time-frequency features based on the plurality of time-frequency transformation coefficients.

* * * * *